(12) United States Patent
Hall et al.

(10) Patent No.: US 9,311,107 B2
(45) Date of Patent: Apr. 12, 2016

(54) BOOTING DEVICES VIA THE CLOUD

(75) Inventors: Michael Hall, Snohomish, WA (US); Steven P. Maillet, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 609 days.

(21) Appl. No.: 13/230,245

(22) Filed: Sep. 12, 2011

(65) Prior Publication Data

US 2013/0067209 A1    Mar. 14, 2013

(51) Int. Cl.
*G06F 15/177* (2006.01)
*G06F 9/44* (2006.01)

(52) U.S. Cl.
CPC ............. *G06F 9/441* (2013.01); *G06F 9/4416* (2013.01); *G06F 15/177* (2013.01)

(58) Field of Classification Search
CPC ...... G06F 15/177; G06F 9/441; G06F 9/4416; G06F 9/445; G06F 8/61; G06F 8/63
USPC .......................................... 713/1, 2; 717/178
See application file for complete search history.

(56) References Cited

U.S. PATENT DOCUMENTS

| | | | |
|---|---|---|---|
| 6,421,777 B1 * | 7/2002 | Pierre-Louis et al. | 713/2 |
| 7,356,679 B1 * | 4/2008 | Le et al. | 713/1 |
| 7,467,293 B2 * | 12/2008 | Zhang et al. | 713/1 |
| 7,788,477 B1 * | 8/2010 | Huang | G06F 9/4416 713/1 |
| 7,797,525 B2 * | 9/2010 | Lee et al. | 713/2 |
| 7,802,084 B2 * | 9/2010 | Fitzgerald et al. | 713/2 |
| 8,438,564 B2 * | 5/2013 | Zhou et al. | 718/1 |
| 8,560,826 B2 * | 10/2013 | Wu et al. | 713/2 |
| 2008/0016150 A1 * | 1/2008 | Chen | 709/203 |
| 2008/0120403 A1 * | 5/2008 | Lowery et al. | 709/223 |
| 2009/0089569 A1 * | 4/2009 | Baribault et al. | 713/2 |
| 2009/0172136 A1 * | 7/2009 | Schulz | G06F 9/4416 709/222 |
| 2010/0125669 A1 | 5/2010 | Esfahany et al. | |
| 2010/0174921 A1 | 7/2010 | Abzarian et al. | |
| 2010/0257346 A1 | 10/2010 | Sosnosky et al. | |
| 2010/0325406 A1 | 12/2010 | Ukeda et al. | |
| 2011/0093941 A1 | 4/2011 | Liu et al. | |

OTHER PUBLICATIONS

"Wyse ThinOS", Retrieved at <<http://www.wyse.com/products/software/os/index.asp>>, Retrieved Date: Jun. 20, 2011, pp. 2.
"Hardware IDs for Mobile PC Input Devices", Retrieved at <<http://www.microsoft.com/taiwan/whdc/device/input/mobilehw-ids.mspx>>, Retrieved Date: Jun. 20, 2011, pp. 2.
"HP VMware ESXi Management Environment", Retrieved at <<http://h20000.www2.hp.com/bc/docs/support/SupportManual/c02000740/c02000740.pdf>>, Retrieved Date: Jun. 20, 2011, pp. 31.

* cited by examiner

*Primary Examiner* — Thuan Du
(74) *Attorney, Agent, or Firm* — John Jardine; Judy Yee; Micky Minhas

(57) ABSTRACT

Methods, systems, and computer program products are provided for automatically installing an operating system on a computing device that does not have an operating system pre-installed. Identifying information for the computing device is collected from a resource of the computing device. The identifying information is transmitted to a remote service. An indication is received of an operating system for the computing device selected by the remote service based on the identifying information. The selected operating system is downloaded for installation on the computing device.

20 Claims, 6 Drawing Sheets

BOOTING DEVICES VIA THE CLOUD

BACKGROUND

An operating system (OS) is a program that executes in computing devices, such as personal computers, smart phones, and video game consoles. The OS is the most important program of a computing device, having the responsibility for managing hardware resources and for providing common services used in the execution of application software. Without an operating system, a user cannot run an application program on their computing device, unless the application program is self booting. Examples of operating systems include the Microsoft Windows® operating systems (e.g., Windows Vista®, Windows Phone 7™, etc.) provided by Microsoft Corporation of Redmond, Wash., Google Android™ provided by Google Inc. of Mountain View, Calif., Linux, which is an open source OS platform, iOS developed by Apple Inc. of Cupertino, Calif. for mobile devices, and Mac OS® X provided by Apple Inc. for personal computers.

Computing devices typically are manufactured and then shipped from the manufacturers with an operating system pre-installed. In this manner, users that purchase computing devices receive the computing devices in an essentially fully operational form. However, updates to operating systems are frequently issued to correct OS bugs, to add further functionality to the operating systems, etc. As such, operating systems that are provided pre-installed in computing devices are often out of date because they lack updates that were not applied to the OS versions maintained by the manufacturers. As such, after purchasing computing devices, users typically have to update the OS of their new device. Such an update is typically performed by the user by connecting a purchased computing device to a computer that runs a tool/utility configured to perform device updates. The tool/utility communicates with a server to determine whether an update to the OS exists, and if so, downloads the OS update to the purchased computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for automatically installing an operating system (OS) on a computing device. The computing device may be received by a user without an OS pre-installed. At boot up of the computing device, the OS may be automatically selected by a service based on information that identifies the computing device. The selected OS may be downloaded from the service or other source and installed on the computing device without user interaction.

For instance, a method implementation in a computing device is provided. Identifying information for the computing device is collected from a resource of the computing device. The identifying information is transmitted to a remote service. An indication is received of an operating system for the computing device selected by the remote service based on the identifying information. The selected operating system is downloaded for installation on the computing device.

Furthermore, a system implementation in a computing device is provided. The computing device includes a boot loader stored in a memory of the computing device, and at least one processor configured to execute the boot loader when the computing device is booted up. The executed boot loader is configured to collect identifying information for the computing device from a resource of the computing device a first time that the boot loader is executed without the computing device having an installed operating system. The computing device is configured to transmit the identifying information to a remote service, and to receive an indication of an operating system for the computing device selected by the remote service based on the identifying information. The selected operating system is downloaded for installation on the computing device.

Still further, a method implementation in a server is described. Identifying information collected at the computing device from a resource of the computing device is received over a network. An operating system for the computing device is selected based at least on the identifying information. An indication of the selected operating system is transmitted to the computing device. The computing device is enabled to download the selected operating system for installation on the computing device.

Still further, a system implementation in a server is provided. The server includes an OS selector. The OS selector receives identifying information collected at the computing device from a resource of the computing device. The OS selector selects an operating system for the computing device based at least on the identifying information. An indication of the selected operating system is transmitted to the computing device by the OS selector. The computing device is enabled to download the selected operating system for installation on the computing device.

Computer program products are also described herein for enabling operating systems to be selected and installed in computing devices, as well as for enabling additional embodiments.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
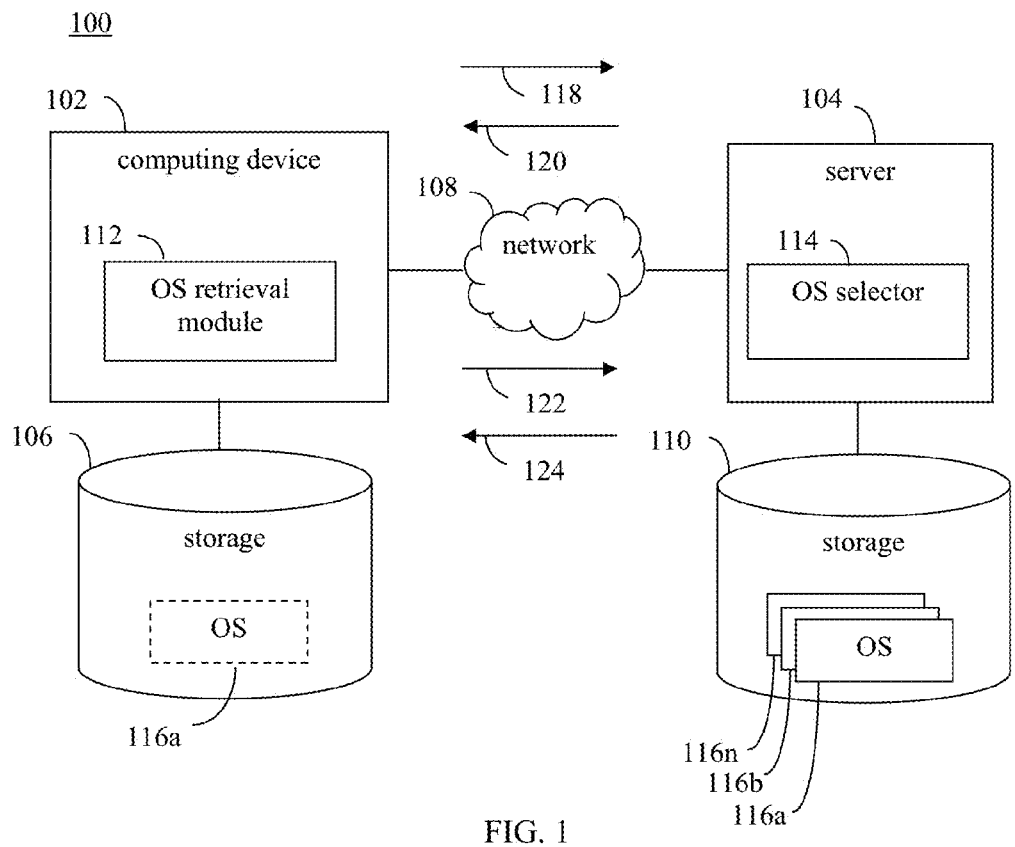
FIG. 1 shows a block diagram of an operating system (OS) installation environment, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It noted that any section/subsection headings provided herein are not intended to be limiting. Embodiments are described throughout this document, and any type of embodiment may be included under any section/subsection.

II. Example Embodiments

Computing devices are typically sold to users with an operating system (OS) already installed. Examples of such computing devices include personal computers, Apple MacBooks®, Apple iPhones, Microsoft Zune® devices, etc. Such pre-installed operating systems may be out of date (not a latest version), or may not be configured for the particular environment in which they are to be used. As such, computing devices may be better situated if they are loaded with an OS after delivery to a user. However, to restore a computing device with a pre-installed OS to a clean/new OS image, or to update an OS image on a computing device to a latest OS configuration, a user needs to be involved in the restore/update process. For instance, users are often required to run specialized tools/utilities to update an OS in a computing device. In some cases, a computing device is connected to a desktop personal computer so that a software utility running on the personal computer can update the OS. In enterprise environments, enterprise tools such as PXE/RIS (preboot execution environment/remote installation services) can be used to image personal computers, including installation of operating systems. However, such techniques are limited to enterprise/closed network environments.

Furthermore, many enterprise OS installation procedures have the user choose the appropriate OS (e.g., choosing 32-bit or 64-bit, the OS version, etc.). However, many users (e.g., consumers) do not know what hardware or software they are running, particularly in the case of consumer grade devices (home desktop computers, tablet computers, laptops, smart phones, etc.). As such, these users may have difficulties with installing operating systems on their devices when they have to make decisions, and would be much benefitted if an up-to-date OS could be installed on their devices with little to no user input.

As such, according to embodiments, operating systems are enabled to be initialized, provisioned, and installed on "naked" computing devices over a network (e.g., using "the cloud"). Embodiments relate to techniques for the automatic installation of an OS on a computing device. In embodiments, a computing device may be received by a user (e.g., after purchase of the computing device by the user) without an OS installed on the computing device. An OS may be installed on the computing device with little to no interaction by the user other than powering up the computing device a first time after the user receives the computing device. In embodiments, the computing device is configured to determine its identity, to provide its determined identity to remote service, and to receive an OS selected by the remote service based on the determined identity for downloading.

Such embodiments may be implemented in a variety of environments. For instance, FIG. 1 shows a block diagram of an OS installation environment 100, according to an example embodiment. As shown in FIG. 1, environment 100 includes a computing device 102, a server 104, a first storage 106, a network 108, and a second storage 110. As shown in FIG. 1, computing device 102 includes an OS retrieval module 112, and server 104 includes an OS selector 114. Environment 100 is described as follows.

Computing device 102 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), a music player (e.g., an Apple iPod®, a Microsoft Zune®, etc.), or other type of mobile device. Server 104 may be implemented in one or more computer systems, including one or more servers, which may be any type of computing device described herein or otherwise known that is capable of enabling the corresponding functionality described herein.

Computing device 102 and server 104 are communicatively coupled by network 108. Network 108 may include one or more communication links and/or communication networks, such as a LAN (local area network), a WAN (wide area network), or a combination of networks, such as the Internet. Computing device 102 and server 104 may be communicatively coupled to network 108 using various links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, etc.

A single computing device 102 is shown in FIG. 1 for purposes of illustration. However, any number of computing devices 102 may be present in environment 100, including tens, hundreds, thousands, and even greater numbers of computing devices 102. Each computing device may include a corresponding OS retrieval module 112 used to retrieve an OS from a remote service (e.g., server 104). As shown in FIG. 1, first storage 106 is coupled to computing device 102, and second storage 110 is coupled to server 104. Storage 106 stores information including data and computer programs (e.g., applications) for computing device 102, and second storage 110 stores information for server 104. Storage 106 and storage 110 may each include one or more of any type of storage mechanism to store information, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

OS retrieval module 112 is configured to retrieve an OS for computing device 102, when computing device 102 does not include an OS. For example, computing device 102 may not include an OS when initially received by a user (e.g., after purchase), or after an OS installed on computing device 102 is deleted. In an embodiment, OS retrieval module 112 determines an identity of computing device 102, and transmits determined identifying information 118 for computing device 102 (e.g., by a make and model of computing device 102, a unique identifier for computing device 102, etc.) to OS selector 114 at server 104.

For instance, as shown in FIG. 1, identifying information 118 may be transmitted to OS selector 114 from computing device 102 in a first communication signal through network 108 to be received by OS selector 114 at server 104. The first communication signal may be transmitted in any form. Based on identifying information 118, OS selector 114 is configured to select an OS for computing device 102. For example, OS selector 114 may select a type of OS (e.g., Microsoft Windows Vista®, Microsoft Windows Phone 7™, Google Android™, Linux, Apple iOS, Apple Mac OS® X, etc.), may select a version of the OS (e.g., a latest available version), may select a number of bits supported by the OS (e.g., 16 bits, 32 bits, 64 bits, etc.), may select a human language supported by the OS (e.g., English, French, German, Japanese, Chinese, etc.), and/or may select one or more other OS features that further define the selected OS.

As shown in FIG. 1, OS selector 114 may transmit selected OS indication 120 from server 104 in a second communication signal through network 108 to be received by OS retrieval module 112 at computing device 102. The second communication signal may be transmitted in any form. Selected OS indication 120 indicates to OS retrieval module 112 that an OS was successfully selected for computing device 102, and may indicate the selected OS (e.g., an identity of the selected OS and/or a network address from which the selected OS may be downloaded). OS retrieval module 112 may subsequently transmit a download request 122 from computing device 102 in a third communication signal through network 108 to be received by OS selector 114 at server 104. Download request 122 is configured to request that OS selector 114 begin download of the selected OS to computing device 102.

For instance, as shown in FIG. 1, a plurality of operating systems 116a-116n may be stored in second storage 110. Operating systems 116a-116n may be a variety of different operating systems for a variety of computing devices. Operating systems 116a-116n may be supplied by corresponding vendors/manufacturers to server 104 to enable their automatic download by computing devices. The OS selected by OS selector 114 may be included in operating systems 116a-116n. As such, in response to download request 122, the selected OS of operating systems 116a-116n may be transmitted as selected OS 124 from server 104 in a fourth communication signal through network 108. As shown in FIG. 1, selected OS 124 is received at computing device 102. OS retrieval module 112 or other installation utility at computing device 102 may install selected OS 124 at computing device 102. For instance, as shown in FIG. 1, selected OS 124 may have been OS 116a, which may be stored in storage 106 as part of an installation procedure.

Note that in an alternative embodiment, download request 122 may be directed to a different server than server 104, and the different server may provide the selected OS to computing device 102 in selected OS 124. For example, download request 122 may be transmitted directly to the manufacturer of the selected OS, rather than to server 104 (where server 104 maintains a pool of operating systems from a variety of manufacturers).

OS retrieval module 112 may be implemented in various ways to perform its functions. For example, in an embodiment, OS retrieval module 112 may be implemented in boot up software/firmware, such as a boot loader. Boot loaders, such as BIOS (basic input/output system) programs and UEFI (unified extensible firmware interface) programs are examples of boot loaders stored in ROM (read only memory) that execute when a computing device is booted (started up). A boot loader includes an initial set of instructions that is performed by a computing device, including loading data and/or programs, such as an OS, from storage of the computing device. Boot loaders can perform various further functions, including providing an ability to obtain an IP (Internet protocol) address from an appropriate DHCP (dynamic host configuration protocol) server (of a local network) or from cell connected hardware (an operator based IP address). Multiple boot loaders may optionally be present in memory that are sequentially run to load a series of programs.

Figure 2:
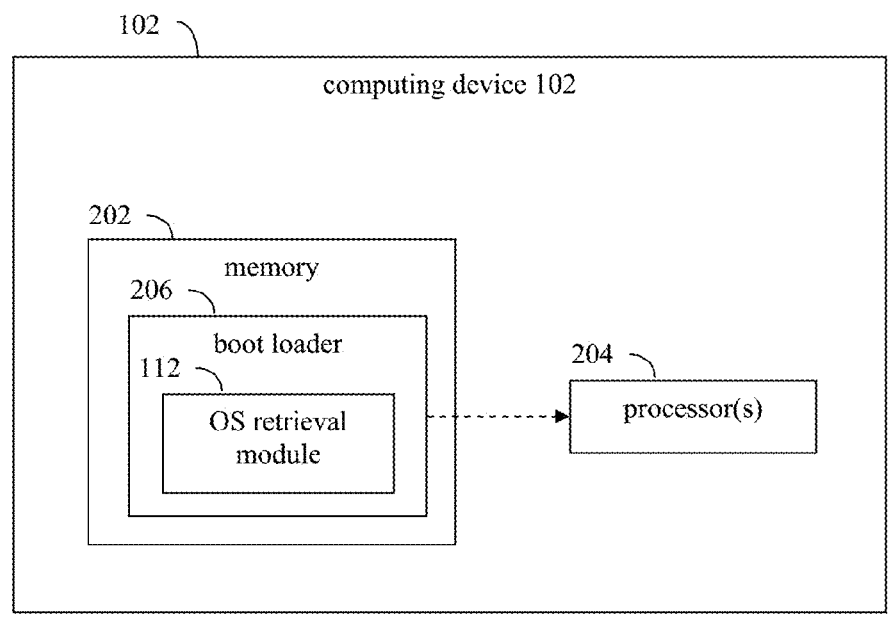
FIG. 2 shows a block diagram of a computing device that includes a boot loader configured to retrieve an OS for the computing device, according to an example embodiment.

FIG. 2 shows a block diagram of computing device 102, where computing device 102 includes a boot loader 206, according to an example embodiment. As shown in FIG. 2, boot loader 206 is included in a memory 202 of computing device 102, and OS retrieval module 112 is included in boot loader 206. For instance, OS retrieval module 112 may be section of program code included in program code of boot loader 206. By including OS retrieval module 112 in boot loader 206, boot loader 206 is configured to retrieve an OS for computing device 102.

As shown in FIG. 2, one or more processor(s) 204 are included in computing device 102. Processor(s) 204 includes one or more processors (e.g., one or more central processing units (CPUs), microprocessors, microcontrollers, etc.) configured to execute boot loader 206 when computing device 102 is booted up (e.g., when power is first applied to computing device 102). In an embodiment, by executing OS retrieval module 112 a first time that boot loader 206 is executed without computing device 102 having an installed OS, boot loader 206 is configured to collect identifying information for computing device from a resource of computing device 102. As described above, computing device 102 transmits the identifying information (identifying information 118) to a remote service (e.g., server 104), and receives an indication of an OS for computing device 102 that was selected by the remote service based on the identifying information (e.g., selected OS indication 120). The selected OS may be downloaded for installation on computing device 102. Subsequently, when boot loader 206 is executed at start up, and an OS is determined to already be installed, OS retrieval module 112 may not be executed.

The above described features of FIGS. 1 and 2 may be configured in various ways, and may perform their functions in various ways, in embodiments. Numerous exemplary embodiments for the above described features of FIGS. 1 and 2 and further embodiments are described in the following subsections.

A. Example Embodiments for Retrieving Operating Systems

According to an example embodiment, a computing device is enabled to retrieve an OS over a network (e.g., the Internet). An identification of the underlying hardware configuration of the computing device is made, such as through a manufacturer, model, and/or hardware identifier of the computing device. The identifying information is transmitted to a remote service, which selects an OS for the computing device, and the computing device is enabled to download the selected OS.

Figure 3:
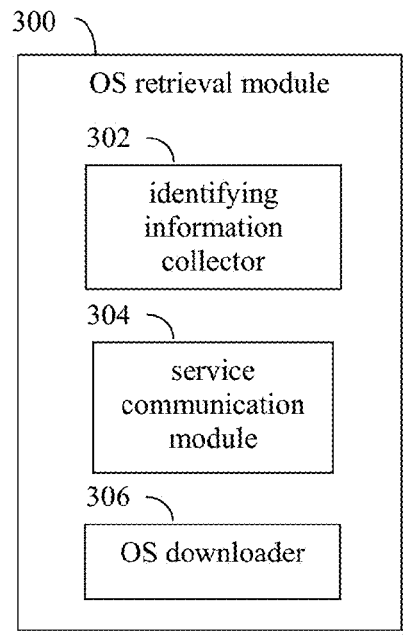
FIG. 3 shows a block diagram of an OS retrieval module, according to an example embodiment.

As described above, OS retrieval may be performed for a computing device by OS retrieval module 112. OS retrieval module 112 of FIGS. 1 and 2 may be configured in various ways to perform its functions. For instance, FIG. 3 shows a block diagram of an OS retrieval module 300, according to an example embodiment. OS retrieval module 300 of FIG. 3 is an example of OS retrieval module 112. As shown in FIG. 3, OS retrieval module 300 includes an identifying information collector 302, a service communication module 304, and an OS downloader 306. OS retrieval module 300 is described as follows.

Identifying information collector 302 is configured to collect identifying information for a computing device (e.g., computing device 102) from a resource of the computing device. Such identifying information may be collected without the computing device having an installed OS. Service communication module 304 is configured to transmit the identifying information collected by OS retrieval module 300 to a remote service (e.g., OS selector 114 at server 104 of FIG. 1). Further, service communication module 304 is configured to receive an indication of an OS selected for the computing device by the remote service based on the identifying information. OS downloader 306 is configured to download the selected OS for installation on the computing device from the remote service or from another source.

Figure 4:
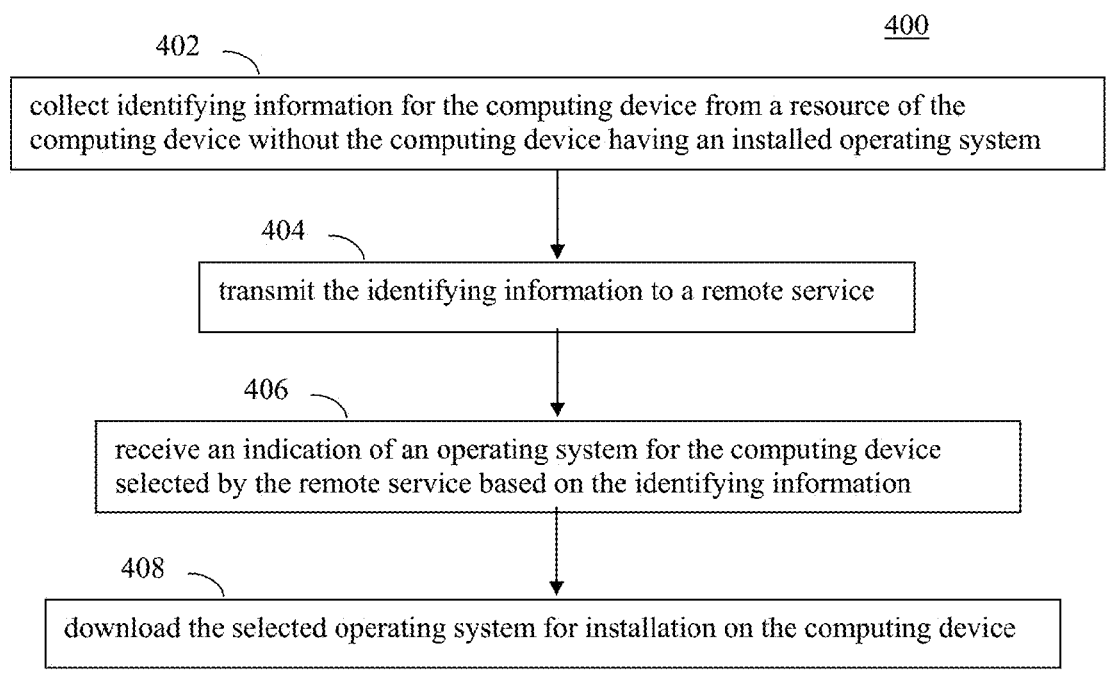
FIG. 4 shows a flowchart providing a process at a computing device for installing an OS at the computing device, according to an example embodiment.
Figure 5:
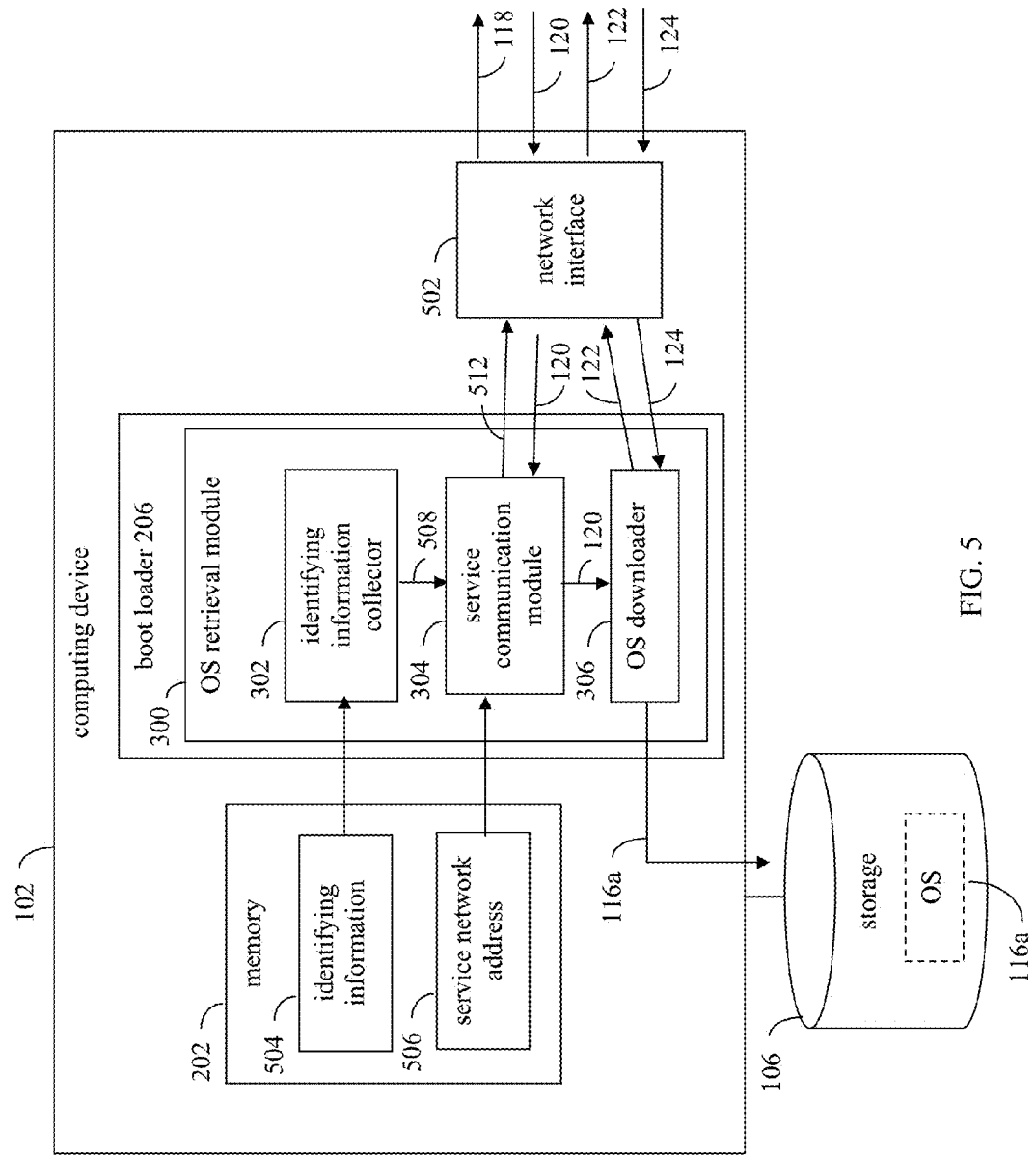
FIG. 5 shows a block diagram of a computing device installing an OS, according to an example embodiment.

FIG. 4 shows a flowchart 400 providing a process for retrieving an OS, according to an example embodiment. In an embodiment, flowchart 400 may be performed by a computing device that includes OS retrieval module 300. For instance, flowchart 400 is described as follows with reference to FIG. 5. FIG. 5 shows a block diagram of computing device 102, according to an example embodiment. As shown in FIG. 5, computing device 102 includes OS retrieval module 300 of FIG. 3, and OS retrieval module 300 is used to retrieve an OS for computing device 102. In the example of FIG. 5, computing device includes memory 202, boot loader 206, and a network interface 502. Boot loader 206 includes OS retrieval module 300, and OS retrieval module 300 includes identifying information collector 302, service communication module 304, and OS downloader 306. Further structural and operational embodiments will be apparent to persons skilled in the relevant art(s) based on the following discussion regarding flowchart 400 and computing device 102 of FIG. 5.

Flowchart 400 begins with step 402. In step 402, identifying information is collected for the computing device from a resource of the computing device without the computing device having an installed OS. In an embodiment, identifying information collector 302 may be configured to perform step 402. For example, a user may power up (e.g., using a power button or switch) or otherwise boot up computing device 102. Upon being booted up, boot loader 206 is executed to perform its functions. For instance, boot loader 206 may optionally display a user interface at a display of computing device 102. The user interface may optionally enable a user of computing device 102 to manually provide boot instructions if the user wants to override an automatic boot sequence. Furthermore, boot loader 206 may be configured to obtain an IP address for computing device 102 (e.g., from a DHCP server)

Still further, OS retrieval module 300 of boot loader 206 may be executed. For example, identifying information collector 302 of OS retrieval module 300 may collect identifying information for computing device 102. As shown in FIG. 5, identifying information collector 302 may access and receive identifying information 504 from memory 202. Identifying information 504 may include one or more identifiers and/or other information that may be used to identify computing device 102. Identifying information 504 may be located together in a single memory location, or may be dispersed across multiple memory locations. Examples of identifying information 504 that may be obtained from memory 202 include a manufacturer identifier, a model identifier (e.g., a model number), and/or a unique hardware identifier for computing device 102.

A manufacturer identifier is an identifier used to identify a manufacturer of computing device 102, and may have any form, such as an alphanumeric code, a manufacture name (such as "Siemens," "Lenovo," "ABB," "HTC," "HP," "Samsung," etc.), or other form. A model identifier is a product identifier or model number used to identify a hardware configuration of computing device 102, which may include an identification of a processor architecture, a memory configuration, a default peripheral set, and/or other hardware configuration information for computing device 102. A model identifier may have any form, including being an alphanumeric code (e.g., "SGH-1917", etc.). Any number of similarly configured computing devices may have a same model identifier. A unique hardware or device identifier is an identifier that identifies computing device 102, and that may be unique to computing device 102 (is not applied to any other computing device). Such a unique identifier may have any form, including being an IMEI (international mobile equipment identity) number. Such a unique identifier may accessed in memory 202 and/or in a hardware identity chip embedded in computing device 102.

As shown in FIG. 5, identifying information collector 302 outputs identifying information 508, which includes the collected identifying information.

In step 404, the identifying information is transmitted to a remote service. For example, referring to FIG. 5, service communication module 304 may receive identifying information 508. Service communication module 304 may transmit identifying information 508 to a remote service (e.g., server 104 of FIG. 1). For instance, as shown in FIG. 1, service communication module 304 may access and receive a service network address 506 in memory 202. Service network address 506 may be a network address (e.g., a URL (uniform resource locator), an IP address, etc.) for the remote service. Note that in another embodiment, the network address for the remote address may be included in (e.g., hardcoded in) service communication module 304, or may be accessed by service communication module 304 at a different location than in memory 202. Service communication module 304 is configured to transmit identifying information 508 to the remote service at the network address indicated by service network address 506.

For instance, as shown in FIG. 5, service communication module 304 outputs network service request 512, which includes identifying information 508 and indicates service network address 506. Network interface 502 receives network service request 512. Network interface 502 is a communication interface for computing device 102 that enables computing device 102 to communicate over a communication network, such as a mobile phone network (e.g., a cellular phone network, such as a GSM (global system for mobile communications) network, a CDMA (code divisional multiplex address) network, etc.) or a computer network (e.g., an Ethernet wired local area network, a WiFi network (e.g., an IEEE 802.11 network), etc.). In an embodiment, service communication module 304 and network interface 502 enable communications directly with the remote service, such that computing device 102 does not need to be connected to an intermediate computer running a utility/tool configured to perform device updates. As shown in FIG. 5, network interface 502 transmits identifying information 118, which includes identifying information 508, to the remote service (e.g., server 104) at service network address 506 through a network (e.g., network 108 of FIG. 1). Network interface 502 may transmit identifying information 118 in a first communication signal according to any suitable communication protocol, as would be known to persons skilled in the relevant art(s).

In step 406, an indication is received of an OS for the computing device selected by the remote service based on the identifying information. For example, as shown in FIG. 5, network interface 502 may receive selected OS indication 120 from the remote service in a second communication signal through a network. Selected OS indication 120 indicates an OS for computing device 102 selected by the remote service according to identifying information 118. Selected OS indication 120 may indicate a network location (e.g., a URL, an FTP (file transfer protocol) address, an IP address, etc.) from which the selected OS may be downloaded. As shown in FIG. 5, service communication module 304 receives selected OS indication 120 from network interface 502.

In step 408, the selected OS is downloaded for installation on the computing device. For example, as shown in FIG. 5, OS downloader 306 may receive selected OS indication 120 from service communication module 304. OS downloader 306 is configured to download to computing device 102 the selected OS indicated in selected OS indication 120. In one embodiment, OS downloader 306 may download the selected OS automatically. In another embodiment, OS downloader 306 may request a user of computing device 102 to confirm that OS downloader 306 may proceed with the downlaod, such as by the user interacting with a user interface provided by computing device 102 (e.g., a graphical user interface (GUI) that is displayed).

As described above, OS downloader 306 may download the selected OS from a network address indicated in selected OS indication 120. OS downloader 306 may generate a download request 122 that is transmitted from computing device 102 by network interface 502 in a third communication signal through a network. Download request 122 is a request to the remote service or other source to begin download of the selected OS to computing device 102. As shown in FIG. 5, in response to download request 122, the selected OS is received at computing device 102 as selected OS 124. Network interface 502 receives selected OS 124 from the remote service or other source in a fourth communication signal through a network. OS downloader 306 receives selected OS 124 from network interface 502, and may be configured to install the OS of selected OS 124 at computing device 102. For instance, as shown in FIG. 5, selected OS 124 may be stored in storage 106 (e.g., as OS 116a), and may optionally be further configured by OS downloader 306 according to an installation procedure. For instance, during the installation, OS downloader 306 may automatically perform various configuration tasks, such as storage partitioning (e.g., flash memory, hard drive, etc.), adding/modifying registry entries, adding/modifying configuration file entries, configuring directories/folders, etc.

Note that in an embodiment, the remote service may provide an indication of a plurality of operating systems that are compatible with computing device 102. For instance, service communication module 304 (through network interface 502) may receive a list of compatible operating systems. The list of compatible operating systems may be displayed by a display of computing device 102 to a user of computing device in a user interface (e.g., a GUI). The user may be enabled to select one of the compatible operating systems to be subsequently downloaded for installation on computing device 102 by OS downloader 306.

B. Example Embodiments for Selecting Operating Systems at a Remote Service

According to an example embodiment, a service selects an OS for a computing device. The service receives identifying information from the computing device over a network. The service (e.g., a "cloud store") may store firmware/OS images that match the identifying information, and may select an OS for the computing device based on the identifying information.

Figure 6:
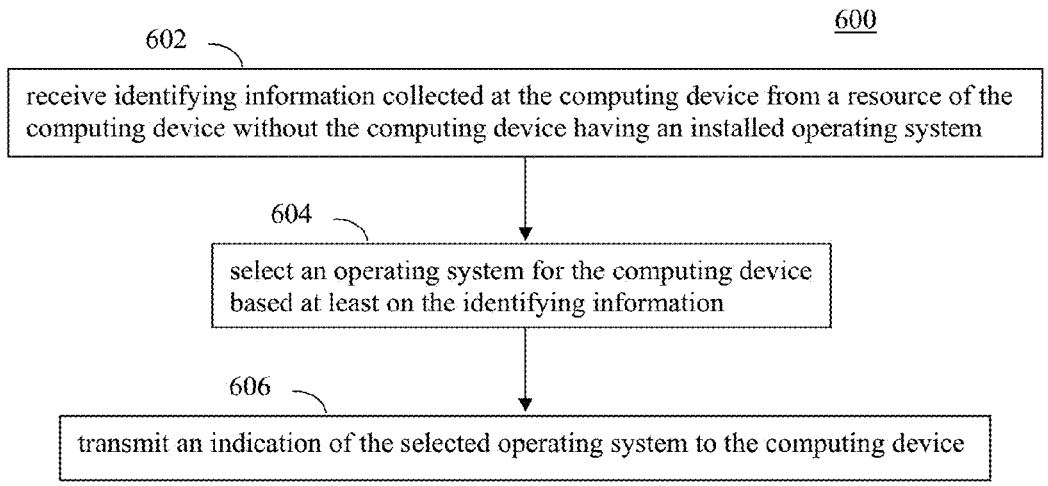
FIG. 6 shows a flowchart providing a process at a server for selecting an OS for a computing device, according to an example embodiment.

As described above, OS selector 114 of FIG. 1 may perform the OS selection. OS selector 114 may operate in various ways to perform its functions. For instance, FIG. 6 shows a flowchart 600 providing a process at a server for selecting an OS for a computing device, according to an example embodiment. In an embodiment, OS selector 114 may operate according to flowchart 600 to select an OS for computing device 102. Flowchart 600 is described as follows. Further structural and operational embodiments will be apparent to persons skilled in the relevant art(s) based on the following discussion regarding flowchart 600.

Flowchart 600 begins with step 602. In step 602, identifying information is received that was collected at the computing device from a resource of the computing device without the computing device having an installed OS. For example, referring to FIG. 1, identifying information 118 is received by OS selector 114 at server 104 from computing device 102 in a first communication signal transmitted through network 108. As described above, identifying information 118 is collected at computing device 102, and includes one or more identifiers associated with computing device 102 and/or further identifying information that indicates a hardware configuration of computing device 102.

In step 604, an OS is selected for the computing device based at least on the identifying information. For example, as described above, OS selector 114 is configured to select an OS for computing device 102 based on identifying information 118. OS selector 114 may be configured to select the OS for computing device 102 in any manner.

For instance, in one embodiment, OS selector 114 may maintain a map of available operating systems-to-computing device data. The map may list any number of operating systems, including, tens, hundreds, and even greater numbers of operating systems. For each listed OS, one or more computing device data entries may be present. Examples of such computing device data entries for each listed OS can include one or more of manufacturer name (of manufacturer(s) of computing devices compatible with the listed OS), model identifier (of computing device(s) with which the listed OS is compatible), unique identifier (of specific computing device(s) with which the listed OS is compatible), etc.

Alternatively, OS selector 114 may maintain a map of computing device data-to-operating systems. For instance, the map may list any number of manufacturer and/or model identifiers, including tens, hundreds, thousands, and even greater numbers of manufacturers/model identifiers. For each listed manufacturer and/or model identifier, one or more operating systems that are compatible with the listed manufacturer and/or model identifier may be listed.

In still another example, OS selector 114 may maintain a map of unique device identifiers-to-operating systems. For instance, the map may list any number of unique device identifiers, including tens, hundreds, thousands, millions, and even greater numbers of unique device identifiers. For each listed unique device identifier, one or more operating systems that are compatible with the listed unique device identifier may be listed.

In such an embodiment, where OS selector 114 maintains one or more of such maps (in storage), identifying information received in identifying information 118 may be applied to the map(s) (e.g., as a key) to select an OS for computing device 102. For instance, a manufacturer identifier, a model identifier, and/or a unique device identifier received in identifying information 118 may be applied to the map(s) to determine one or more operating systems compatible with computing device 102.

For example, identifying information 118 may include the manufacturer identifier "Samsung" and the model identifier "Focus" for computing device 102. Furthermore, OS selector 114 may maintain a map of computing device data-to-operating systems, where computing device data is listed in rows, and compatible operating systems are indicated in columns. OS selector 114 may apply the manufacturer identifier "Samsung" and the model identifier "Focus" to the map to determine that "Microsoft® Windows Phone 7™" is a compatible OS to computing device 102.

In another example, identifying information 118 may include the unique device identifier "49-015420-323751" (IEMI) for computing device 102. Furthermore, OS selector 114 may maintain a map of unique device identifiers-to-operating systems, where unique device identifiers are listed in rows, and compatible operating systems are indicated in columns. OS selector 114 may apply the unique device identifier "49-015420-323751" as a key to the map to determine that "Mac OS® X" is a compatible OS to computing device 102.

Note that in further embodiments, OS selector 114 may use other techniques than a map to select operating systems based on identifying information, as would be apparent to persons skilled in the relevant art(s) from the teachings herein.

Referring back to FIG. 6, in step 606, an indication of the selected OS is transmitted to the computing device. For example, as shown in FIG. 1, OS selector 114 may transmit selected OS indication 120 from server 104 in a second communication signal through network 108 to be received by OS retrieval module 112 at computing device 102. Selected OS indication 120 indicates the OS selected for computing device 102. Furthermore, as described above, OS selector 114 may subsequently receive a download request 122 from computing device 102 in a third communication signal. In response, OS selector 114 may begin download of the selected OS to computing device 102 (as selected OS 124).

As described above, in an embodiment, OS selector 114 may determine a plurality of operating systems that are compatible with computing device 102 based on identifying information 118. For instance, for identifying information 118 that includes a manufacturer identifier of "Dell Computer" and a model identifier of "Inspiron 15", OS selector 114 may determine that both of the operating systems of "Windows® 7 Home Premium, 64 bit, English" and "Linux" are compatible. In such a case, OS selector 114 may enable a user to select which of the multiple operating systems is to be installed on computing device 102.

Figure 7:
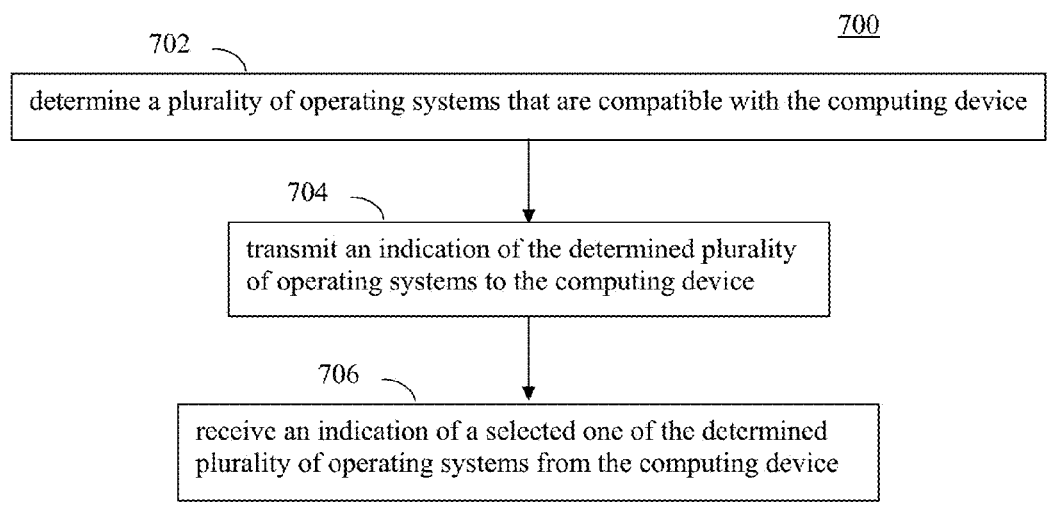
FIG. 7 shows a flowchart providing a process at a server for enabling a user to select an OS for a computing device from a plurality of operating systems, according to an example embodiment.

For instance, FIG. 7 shows a flowchart 700 providing a process at a server for enabling a user to select an OS for a computing device from a plurality of operating systems, according to an example embodiment. In an embodiment, OS selector 114 of FIG. 1 may perform flowchart 700. Flowchart 700 is described as follows. Further structural and operational embodiments will be apparent to persons skilled in the relevant art(s) based on the following discussion regarding flowchart 700.

Flowchart 700 begins with step 702. In step 702, a plurality of operating systems that are compatible with the computing device is determined. For instance, in a manner as described above (e.g., by reference to a map, etc.), OS selector 114 may determine multiple operating systems compatible with computing device 102 based on identifying information 118. Any number of operating systems may be determined by OS selector 114 to be compatible with computing device 102.

In step 704, an indication of the determined plurality of operating systems is transmitted to the computing device. For example, in an embodiment, OS selector 114 may transmit a list of the compatible operating systems in a communication signal to computing device 102 (e.g., service communication module 304) through network 108.

In step 706, an indication of a selected one of the determined plurality of operating systems is received from the computing device. For example, in an embodiment, OS selector 114 may receive an indication in a communication signal from computing device 102 of a selected OS from the list compatible operating systems. For instance, the selected OS may have been selected from the list by a user of computing device 102. As described above, the selected OS may be subsequently downloaded and installed at computing device 102.

In an embodiment, one or more operating systems available at server 104 (e.g., operating systems 116a-116n) may each contain a plurality of drivers and/or other features that are not used by all compatible computing devices. For instance, an OS at server 104 may include multiple device drivers or software drivers for a particular hardware feature, such as multiple devices drivers for different types of hard disk drives, graphics processors, USB hubs, internal peripherals connected to a processor, etc. Because a computing device may include a particular type of hard disk drive, the OS used by the computing device may include the driver for the particular hard disk drive type. However, the OS may not need to include hard disk drive drivers for other types of hard disk drives. As such, the OS image or instance downloaded to the computing device may have the other hard disk drive drivers removed prior to download. In this manner, storage space at the computing device may be conserved (by not storing unused drivers in storage of the computing device).

Figure 8:
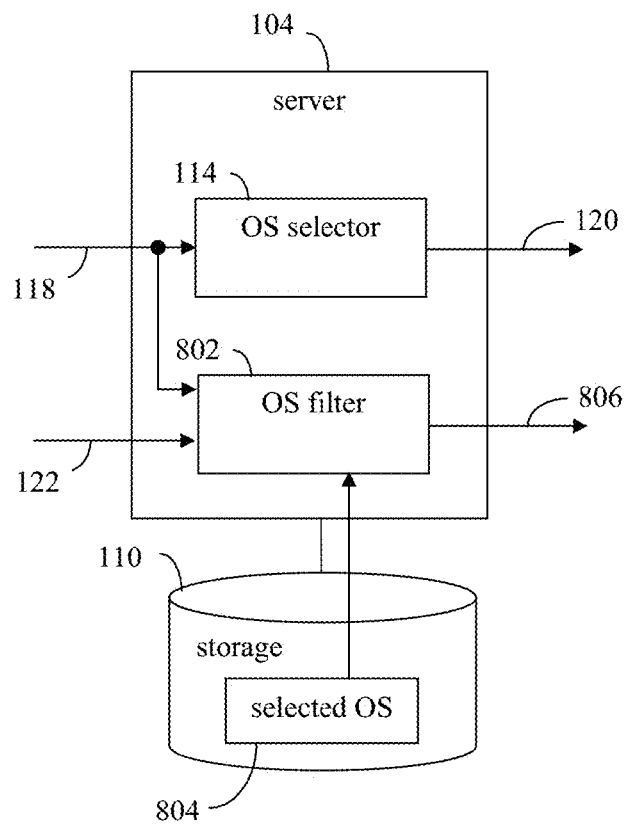
FIG. 8 shows a block diagram of a server configured to select an OS for a computing device, and to filter the selected OS, according to an example embodiment.

For instance, FIG. 8 shows a block diagram of server 104 configured to select an OS for a computing device, and to filter the selected OS, according to an example embodiment. As shown in FIG. 8, server 104 includes OS selector 114 and an OS filter 802. OS filter 802 is configured to filter an OS selected by OS selector 114 for a computing device. For example, as shown in FIG. 8, OS selector 114 receives identifying information 118 (from a computing device) and outputs selected OS indication 120. Furthermore, OS filter 802 receives download request 122 from the computing device. OS filter 802 retrieves a selected OS 804 from storage 110, which is the selected OS indicated in download request 122. OS filter 802 filters selected OS 804 to remove unneeded drivers and/or other OS features, to generate filtered OS 806. Filtered OS 806 is downloaded to the computing device for installation in response to download request 122.

Figure 9:
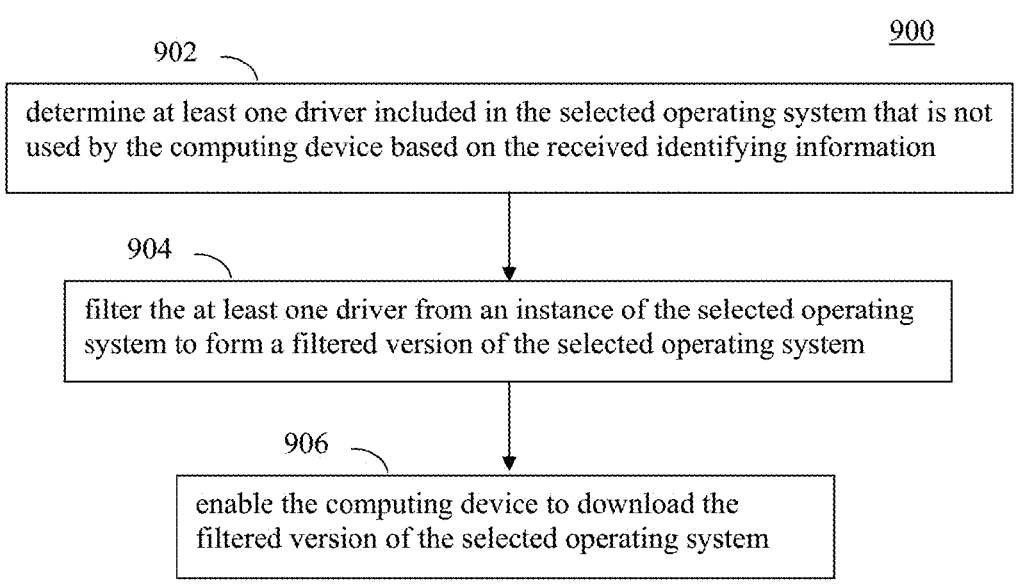
FIG. 9 shows a flowchart providing a process at a server for filtering a selected OS, according to an example embodiment.

FIG. 8 is described as follows with respect to FIG. 9. FIG. 9 shows a flowchart 900 providing a process at a server for filtering a selected OS, according to an example embodiment. In an embodiment, flowchart 900 may be performed by OS filter 802 of FIG. 8. Further structural and operational embodiments will be apparent to persons skilled in the relevant art(s) based on the following discussion regarding flowchart 900.

Flowchart 900 begins with step 902. In step 902, at least one driver included in the selected OS is determined that is not used by the computing device based on the received identifying information. For example, with reference to FIG. 8, OS filter 802 may determine one or more drivers (and/or other OS features) of a selected OS indicated in download request 122 that are not used by the requesting computing device. For instance, OS filter 902 may maintain (e.g., in storage 110) a table that indicates drivers (and optionally further OS features) included by default in each OS stored in storage 110. Based on the model indicator (e.g., in identifying information 118) for a computing device 102, OS filter 902 may determine default drivers and/or other OS features listed in the table that are not used by the computing device 102.

In step 904, the at least one driver is filtered from an instance of the selected OS to form a filtered version of the selected OS. For example, as shown in FIG. 8, OS filter 802 may retrieve an instance (e.g., a copy) of selected OS 804 from storage 110. In an embodiment, OS filter 802 may be configured to filter one or more drivers (and/or other OS features) from selected OS 804 that were determined to not be used by computing device 102. For instance, OS filter 802 may filter out a driver by removing one or more files and/or other data structures associated with the driver from the retrieved instance of selected OS 804. As shown in FIG. 8, OS filter 802 outputs filtered OS 806 (which does not included the filtered out driver(s).

In step 906, the computing device is enabled to download the filtered version of the selected OS. In an embodiment, computing device 102 may download filtered OS 806, and install filtered OS 806 in a manner as described above or other manner.

As such, in embodiments, operating systems may be selected for computing devices and installed on the computing devices. In embodiments, an OS may be selected and downloaded in an automatic fashion without user interaction (other than optionally enabling a user to select an OS from multiple compatible operating systems). The user may boot up a computing device, and a boot loader of the computing device may automatically enable an OS to be selected for the computing device. The selected OS may be automatically downloaded to the computing device. In this manner, a user that is not sophisticated with respect to operating systems may receive a computing device that does not have an OS installed, and may have an OS automatically installed on the computing device. Furthermore, the installed OS may be a latest version of the OS, rather than having a pre-installed OS that has to be updated on the computing device.

Furthermore, because OS selector 114 may receive identifying information such as unique device identifiers, OS selector 114 may be used to centrally register computing devices using their unique device identifiers. In this manner, the OS installed at each computing device, and the OS and computing device configurations may be registered and tracked for computing devices using their unique identifiers. Furthermore, an indication that a computing device has been activated may be centrally stored/maintained by OS selector 114 using the unique identifiers.

III Example Computing Device Embodiments

OS retrieval module 112, OS selector 114, boot loader 206, OS retrieval module 300, identifying information collector 302, service communication module 304, OS downloader 306, OS filter 802, flowchart 400, flowchart 600, flowchart 700, and flowchart 900 may be implemented in hardware, software, firmware, or any combination thereof. For example, OS retrieval module 112, OS selector 114, boot loader 206, OS retrieval module 300, identifying information collector 302, service communication module 304, OS downloader 306, OS filter 802, flowchart 400, flowchart 600, flowchart 700, and/or flowchart 900 may be implemented as computer program code configured to be executed in one or more processors. Alternatively, OS retrieval module 112, OS selector 114, boot loader 206, OS retrieval module 300, identifying information collector 302, service communication module 304, OS downloader 306, OS filter 802, flowchart 400, flowchart 600, flowchart 700, and/or flowchart 900 may be implemented as hardware logic/electrical circuitry. For instance, in an embodiment, one or more of OS retrieval module 112, OS selector 114, boot loader 206, OS retrieval module 300, identifying information collector 302, service communication module 304, OS downloader 306, OS filter 802, flowchart 400, flowchart 600, flowchart 700, and/or flowchart 900 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

As described above, OS retrieval modules may generate one or more user interfaces. For instance, OS retrieval modules may enable user input to be provided from one or more of any type of user interface elements provided by computing device 102, including a keyboard, a thumb wheel, a pointing device, a roller ball, a stick pointer, a touch sensitive display, any number of virtual interface elements, a voice recognition system, etc. Graphical user interfaces (GUI) may be displayed in a display of the computing device, such as in a browser window generated by a web browser, or in other window type.

Figure 10:
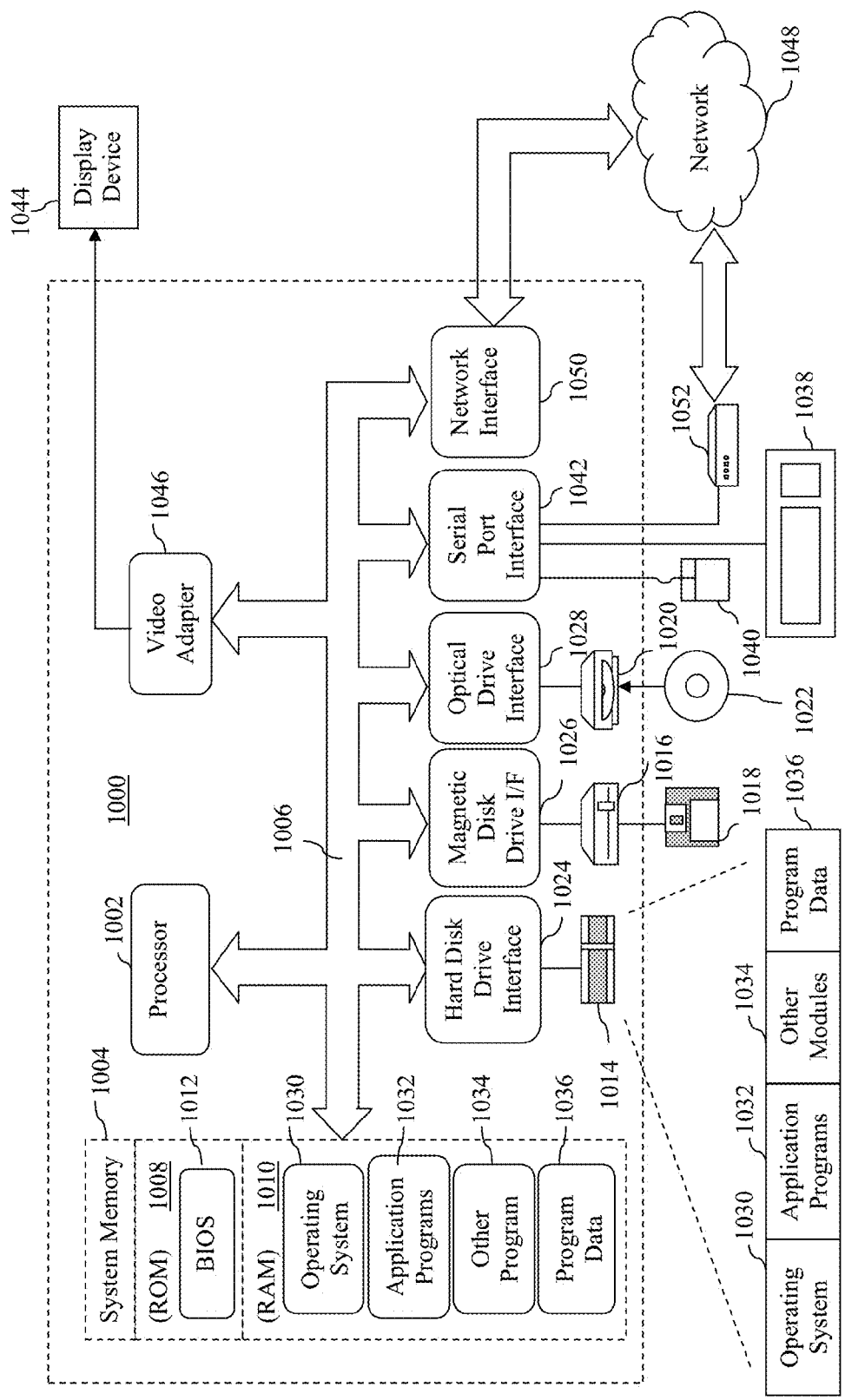
FIG. 10 shows a block diagram of an example computer that may be used to implement embodiments of the present invention.

FIG. 10 depicts an exemplary implementation of a computer 1000 in which embodiments of the present invention may be implemented. For example, computing device 102 and/or server 104 may be implemented in a computer system similar to computer 1000, including one or more features of computer 1000 and/or alternative features. Computer 1000 may be a general-purpose computing device in the form of a conventional personal computer, a mobile computer, a server, or a workstation, for example, or computer 1000 may be a special purpose computing device. The description of computer 1000 provided herein is provided for purposes of illustration, and is not intended to be limiting. Embodiments of the present invention may be implemented in further types of computer systems, as would be known to persons skilled in the relevant art(s).

As shown in FIG. 10, computer 1000 includes one or more processors 1002, a system memory 1004, and a bus 1006 that couples various system components including system memory 1004 to processor 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic (e.g., computer program code) for implementing OS retrieval module 112, OS selector 114, boot loader 206, OS retrieval module 300, identifying information collector 302, service communication module 304, OS downloader 306, OS filter 802, flowchart 400, flowchart 600, flowchart 700, and/or flowchart 900 (including any step of flowcharts 400, 600, 700, and 900), and/or further embodiments described herein.

A user may enter commands and information into the computer 1000 through input devices such as keyboard 1038 and pointing device 1040. Other input devices (not shown) may include a microphone, joystick, game pad, satellite dish, scanner, or the like. These and other input devices are often connected to processor 1002 through a serial port interface 1042 that is coupled to bus 1006, but may be connected by other interfaces, such as a parallel port, game port, or a universal serial bus (USB).

A display device 1044 is also connected to bus 1006 via an interface, such as a video adapter 1046. In addition to the monitor, computer 1000 may include other peripheral output devices (not shown) such as speakers and printers.

Computer 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to generally refer to media such as the hard disk associated with hard disk drive 1014, removable magnetic disk 1018, removable optical disk 1022, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable computer 1000 to implement features of embodiments of the present invention discussed herein. Accordingly, such computer programs represent controllers of the computer 1000.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device, comprising:
   collecting identifying information for the computing device from a resource of the computing device without the computing device having an installed operating system;

transmitting the identifying information to a remote service;

receiving an indication of an operating system for the computing device selected by the remote service based on the identifying information applied as a key to at least one map that maps the key to at least one operating system; and downloading a filtered version of the selected operating system instead of the selected operating system for installation on the computing device, the remote service having generated the filtered version by removing a feature of the selected operating system determined by the remote service to not be usable by the computing device.

2. The method of claim 1, further comprising:
executing a boot loader upon powering up the computing device; wherein said collecting comprises:
collecting the identifying information for the computing device using the boot loader.

3. The method of claim 2, wherein said executing a boot loader upon powering up the computing device is performed a first time that the computing device is powered up by a user of the computing device after the computing device is purchased.

4. The method of claim 2, wherein said collecting the identifying information for the computing device using the boot loader comprises:
retrieving the identifying information from a memory that is accessible by a processor that executes the boot loader.

5. The method of claim 1, wherein the identifying information includes a model identifier of the computing device.

6. The method of claim 5, wherein the identifying information further includes at least one of a manufacturer identifier that identifies a manufacturer of the computing device or an identifier specific to the computing device.

7. The method of claim 1, wherein said transmitting comprises:
transmitting the identifying information to the remote service from the computing device over a mobile phone wireless communication network or an Ethernet link.

8. The method of claim 1, wherein said transmitting comprises:
determining a network address for the remote service from a resource of the computing device.

9. The method of claim 1, wherein said receiving an indication of an operating system for the computing device selected by the remote service based on the identifying information comprises:
receiving an indication of a plurality of operating systems that are compatible with the computing device; and
enabling a user of the computing device to select one of the plurality of operating systems to be downloaded for installation on the computing device.

10. The method of claim 1, wherein said downloading comprises:
filtering the selected operating system into the filtered version that does not include one or more drivers determined to not be useable by the computing device.

11. A computing device, comprising:
a boot loader stored in a memory of the computing device; and
at least one processor configured to execute the boot loader when the computing device is booted up;
the executed boot loader configured to collect identifying information for the computing device from a resource of the computing device a first time that the boot loader is executed without the computing device having an installed operating system;
the computing device configured to transmit the identifying information to a remote service, and to receive an indication of an operating system for the computing device selected by the remote service based on the identifying information applied as a key to at least one map that maps the key to at least one operating systems; and
wherein a filtered version of the selected operating system instead of the selected operating system is downloaded for installation on the computing device, the remote service having generated the filtered version by removing a feature of the selected operating system determined by the remote service to not be usable by the computing device.

12. The computing device of claim 11, wherein the resource is a memory that is accessible by the at least one processor.

13. The computing device of claim 11, wherein the identifying information includes at least one of a model identifier of the computing device, at least one of a manufacturer identifier that identifies a manufacturer of the computing device, or an identifier specific to the computing device.

14. The computing device of claim 11, further comprising:
a network interface configured to transmit the identifying information to the remote service from the computing device over at least one of a mobile phone wireless communication network or an Ethernet link.

15. The computing device of claim 11, wherein the boot loader is configured to determine a network address for the remote service from a resource of the computing device.

16. A method in a server, comprising:
receiving identifying information collected at the computing device from a resource of the computing device without the computing device having an installed operating system, the identifying information received over a network;
selecting an operating system for the computing device based at least on the identifying information applied as a key to at least one map that maps the key to at least one operating systems;
filtering the selected operating system to create a filtered version of the selected operating system, said filtering comprising
determining a feature of the selected operating system not usable by the computing device, and
removing the determined feature of the selected operating system to generate the filtered version; and
transmitting an indication of the selected operating system to the computing device, the computing device enabled to download the filtered version of the selected operating system instead of the selected operating system for installation on the computing device.

17. The method of claim 16, wherein the identifying information is collected and received from the computing device a first time that the computing device is powered up by a user of the computing device after the computing device is purchased.

18. The method of claim 16, wherein the identifying information includes at least one of a model identifier of the computing device, at least one of a manufacturer identifier that identifies a manufacturer of the computing device, or an identifier specific to the computing device.

19. The method of claim 16, wherein said selecting comprises:
determining a plurality of operating systems that are compatible with the computing device;
transmitting an indication of the determined plurality of operating systems to the computing device; and receiving an indication of a selected one of the determined plurality of operating systems from the computing device;

wherein the computing device is enabled to download the selected one of the determined plurality of operating systems for installation on the computing device.

20. The method of claim 16, wherein said filtering further comprises:

determining at least one driver included in the selected operating system that is not used by the computing device based on the received identifying information;

filtering the at least one driver from an instance of the selected operating system to form the filtered version of the selected operating system; and enabling the computing device to download the filtered version of the selected operating system.

\* \* \* \* \*